US008963682B2

(12) United States Patent
Diederiks et al.

(10) Patent No.: US 8,963,682 B2
(45) **Date of Patent: *Feb. 24, 2015**

(54) MULTI-DIMENSIONAL CONTROL OF LIGHTING PARAMETERS

(75) Inventors: Elmo M. A. Diederiks, Eindhoven (NL); Martijn Santbergen, Amsterdam (NL); Gerard Hollemans, Eindhoven (NL)

(73) Assignee: Koninklijkle Philips N.V., Eindhoven (NL)

( * ) Notice: Subject to any disclaimer, the term of this patent is extended or adjusted under 35 U.S.C. 154(b) by 626 days.

This patent is subject to a terminal disclaimer.

(21) Appl. No.: 13/247,329

(22) Filed: Sep. 28, 2011

(65) Prior Publication Data

US 2012/0194095 A1 Aug. 2, 2012

Related U.S. Application Data

(63) Continuation of application No. 11/719,691, filed as application No. PCT/IB2005/053816 on Nov. 18, 2005, now Pat. No. 8,044,769.

(60) Provisional application No. 60/629,798, filed on Nov. 19, 2004.

(51) Int. Cl.

| | |
|---|---|
| ***H05B 37/02*** | (2006.01) |
| ***G05B 11/01*** | (2006.01) |
| ***G06F 3/048*** | (2013.01) |

(Continued)

(52) U.S. Cl.
CPC .................................. *H05B 33/0863* (2013.01)
USPC .......... 340/5.64; 340/5.1; 340/4.61; 340/12.5

(58) Field of Classification Search
CPC ........ H05B 37/02; G05B 11/01; G05B 13/02; G06F 3/048; H04Q 1/00
USPC .................... 340/5.64, 5.1, 4.61, 12.5, 13.24; 315/292; 362/231; 249/12, 85
See application file for complete search history.

(56) References Cited

U.S. PATENT DOCUMENTS 3,539,962 A 11/1970 Erban
5,598,187 A * 1/1997 Ide et al. ........................ 345/158

(Continued)

FOREIGN PATENT DOCUMENTS

DE 19942177 A1 3/2001
EP 0192882 B1 4/1993

(Continued)

OTHER PUBLICATIONS

Isdale, "What is virtual reality", Version 2.1, Oct. 8, 1993, Section 1.7, 1.7.4, 1.7.7, 1.7.8.2.

*Primary Examiner* — Nam V Nguyen
(74) *Attorney, Agent, or Firm* — Meenakshy Chakravorty

(57) ABSTRACT

A multi-dimensional controller (150) controls the multiple parameters of a lighting system (250). A track-ball (100) that provides three axes of rotation (101-103), for example, is used to control each of three lighting parameters, such as chrominance, luminance, and saturation. In like manner, intensity, direction, and diffusion control may be controlled by a device with three degrees of freedom/control. Force-feedback (120) is optionally provided to indicate divergence from established presets (220) or recommended operating conditions. Switches (130) and other control elements are also provided to store or recall preset parameters (220), override scheduled lighting settings, and so on.

11 Claims, 3 Drawing Sheets

(51) Int. Cl.

| | |
|---|---|
| ***H04Q 1/00*** | (2006.01) |
| ***H05B 33/08*** | (2006.01) |

(56) References Cited

U.S. PATENT DOCUMENTS

| | | | | |
|---|---|---|---|---|
| 6,597,347 | B1 | 7/2003 | Yasutake | |
| 7,444,187 | B2 | 10/2008 | Diederiks et al. | |
| 7,731,387 | B2 | 6/2010 | Cortenraad et al. | |
| 8,044,769 | B2 * | 10/2011 | Diederiks et al. | 340/5.64 |
| 2003/0057887 | A1 | 3/2003 | Dowling et al. | |
| 2004/0164956 | A1 * | 8/2004 | Yamaguchi et al. | 345/156 |
| 2006/0026535 | A1 * | 2/2006 | Hotelling et al. | 715/863 |

FOREIGN PATENT DOCUMENTS

| | | | |
|---|---|---|---|
| WO | 2004072840 | A1 | 8/2004 |
| WO | 2005107338 | A2 | 11/2005 |

* cited by examiner

MULTI-DIMENSIONAL CONTROL OF LIGHTING PARAMETERS

This application is a continuation of U.S. patent application Ser. No. 11/719,691, which is a national stage application under 35 U.S.C. §371 of International Application No. PCT/IB2005/053816 filed on Nov. 18, 2005, which claims priority to U.S. Provisional Application No. 60/629,798, filed on Nov. 19, 2004, incorporated herein by reference.

This invention relates to the field of lighting systems, and in particular to a multi-dimensional control system for varying lighting parameters.

The lighting of an environment has a significant effect on the ambiance associated with the environment. Environments conducive to reading are typically brightly lit; environments conducive to romance are typically dimly lit; and so on. In addition to the luminance level, the chromatic content also affects the ambiance of the environment. A yellow or red tinted light is generally considered to be "warmer" than a blue tinted light. Similarly, the saturation (white content) of the light and other parameters, such as the degree of dispersion of the light, will affect the ambiance.

Conventional lighting systems use variable control switches to set the parameters for the desired lighting effect. In a home environment, different on/off switches or variable dimmers are used to control each light or set of lights to achieve the desired effect. In a theatre environment, a control panel containing numerous sliding or rotating controls knobs is typically used to achieve the desired effect.

European Published Application 0192882, "LIGHT SOURCE HAVING AUTOMATICALLY VARIABLE HUE, SATURATION, AND BEAM DIVERGENCE", filed 30 Oct. 1985, discloses a light fixture wherein different filters and lenses can be oriented relative to a source of white light to vary the hue, saturation, and divergence of the projected light, and is incorporated by reference herein. As in typical embodiments of the era, the control panel for the variable light source includes sliding and rotating control knobs.

Increasingly, computers are being used to store sets of lighting parameters that can be recalled via a single command to achieve a desired effect.

U.S. Published Patent Application 2003/0057887, "SYSTEMS AND METHODS OF CONTROLLING LIGHT SYSTEMS", filed 13 Jun. 2002, discloses a multi-light system wherein the color and intensity of each light, or sets of lights, is controlled from a central controller via wireless communications, and is incorporated by reference herein. A graphic representation of the environment being controlled is preferably used to select and assign control parameters for each light or set of lights. These parameters are stored in a file, and "played back" (i.e. read from the file and communicated to the lights) when desired. The playback may be initiated directly by a user, or programmed to occur according to a defined schedule.

It is an object of this invention to provide an interface for controlling multiple parameters of a light source. It is a further object of this invention to provide an interface for controlling multiple parameters of a light source that is compatible with both manual and computer controlled lighting systems. It is a further object of this invention to provide an interface for controlling multiple parameters of a light source that is easy and intuitive to use, and optionally provides feedback during use.

These objects and others are achieved by providing a multi-dimensional controller for controlling the multiple parameters of a lighting system. A track-ball that provides three axes of rotation, for example, is used to control each of three lighting parameters, such as chrominance, luminance, and saturation. In like manner, intensity, direction, and diffusion control may be controlled by a device with three degrees of freedom/control. Force-feedback is optionally provided to indicate divergence from established presets or recommended operating conditions. Switches and other control elements are also provided to store or recall preset parameters, override scheduled lighting settings, and so on.

The invention is explained in further detail, and by way of example, with reference to the accompanying drawings wherein.

Throughout the drawings, the same reference numeral refers to the same element, or an element that performs substantially the same function. The drawings are included for illustrative purposes and are not intended to limit the scope of the invention.

The invention includes a multi-dimensional input device that is used to control multiple parameters in a lighting system. For ease of presentation and understanding, the invention is presented using a track-ball as a paradigm for a multi-dimensional input device. One of ordinary skill in the art will recognize that any of a variety of multi-dimensional input devices may be used, including, for example, a conventional joystick, mouse, and so on, as well as more advanced devices, such as virtual-reality (VR) gloves, suits, headgear, and so on. One of ordinary skill in the art will also realize that although a track-ball is a "relative location" or "motion-based" input device, like a mouse, the principles of this invention are equally applicable using an "absolute location" or "position-based" device, such as a graphics tablet wherein the absolute location of a pointing device on the surface of the tablet defines a two-dimensional coordinate. In like manner, the term "dimension" is used herein in the general sense, and includes any distinguishable aspect about which motion can be detected. For example, in a three-dimensional space, the dimensions may be up-down, left-right, and forward-back; in a spherical space, the dimensions may be roll, pitch, and yaw; in a fixed space, the dimensions may be stress and torque; and so on.

Figure 1A:
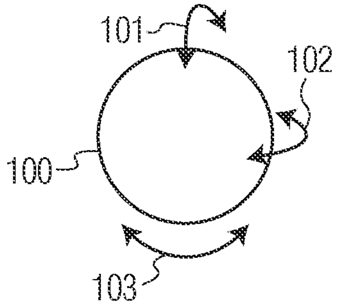
FIGS. 1A-1E illustrate example embodiments of a three-dimensional track-ball for use in this invention.
Figure 1B:
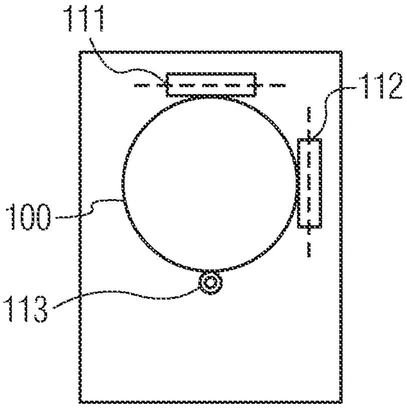

FIGS. 1A-1E illustrate example embodiments of a three-dimensional track-ball for use in this invention. FIG. 1A illustrates an example ball 100 that can rotate in any combination of directions 101, 102, 103. This ball 100 may contain internal inertial sensors that report movement of the ball 100, but in a more traditional embodiment, the ball 100 is mounted in a base 110 that includes sensors 111, 112, and 113 that are configured to report motion in each of the directions 101, 102, 103, respectively, as illustrated in FIG. 1B. The example sensors 111, 112, and 113 include rollers that are tangent to the ball 100, and rotate in each of three orthogonal directions, and sensing devices, such as optical pickups that communicate pulses or other signals corresponding to the rotation. A controller (150 of FIG. 2), discussed further below, receives these signals, from which a magnitude of movement of the ball 100 can be determined.

Figure 1C:
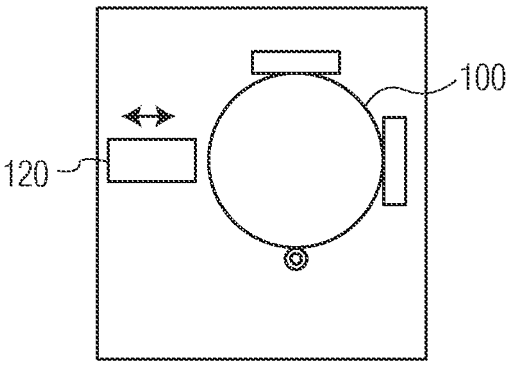

FIG. 1C illustrates another aspect of this invention, wherein a feedback element 120 is included in the multi-dimensional input device. For ease of understanding, the feedback element 120 is illustrated as being movable in a direction perpendicular to the surface of the ball 100, so as to exert a force that provides resistance to the rotation of the ball.

One of ordinary skill in the art will recognize that other arrangements can be used to provide more selective feedback; for example, an arrangement that resists motion of the ball in a particular direction or combination of directions. In like manner, if a VR-glove is used as the multi-dimensional input device, the tension on elements of the glove can be selectively controlled to resist, or assist, motion in particular directions.

Figure 1D:
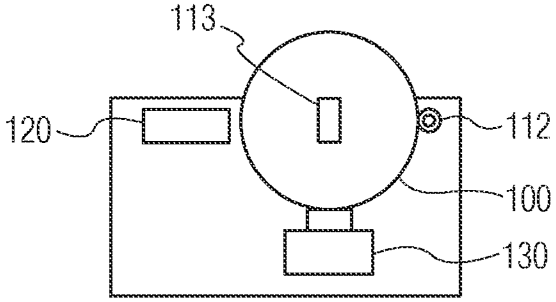

FIG. 1D illustrates another aspect of this invention, wherein a switch device 130 is included in the multi-dimensional input device. In this example, the switch device 130 may be a microswitch that is located beneath the ball 100, and reacts to vertical pressure being exerted on the ball by a user. Other switch arrangements will be obvious to one of ordinary skill in the art, including switches that are independent of the ball 100.

Figure 1E:
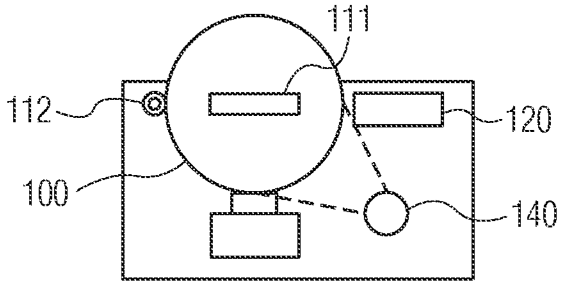

FIG. 1E illustrates another aspect of this invention, wherein a light element 140 is included in the multi-dimensional input device. In this example, the ball 100 is translucent, and the light element 140 is configured to project light to the ball 100 based on parameters determined by motion of the ball 100. Preferably, the projected light corresponds to the lighting effects that the multi-dimensional input device is producing, or will produce, in an actual environment.

Figure 2:
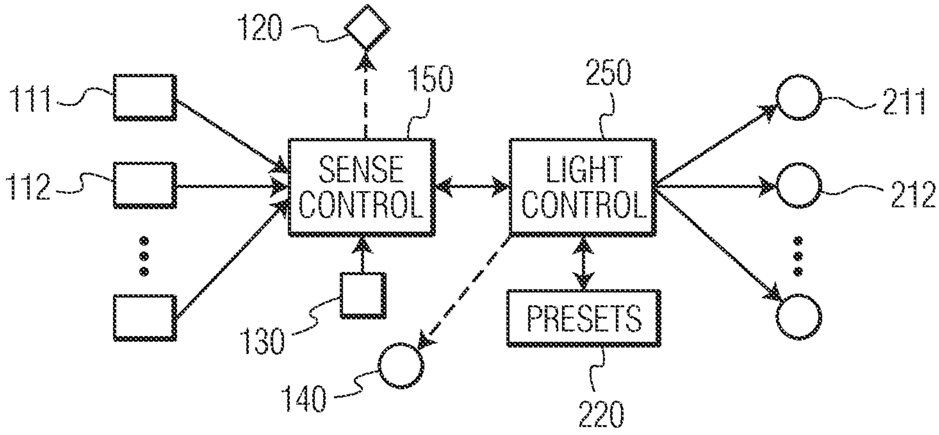
FIG. 2 illustrates an example block diagram of a lighting control system in accordance with this invention.

FIG. 2 illustrates an example block diagram of a multi-dimensional light controller in accordance with this invention. A controller 150 receives signals from motion sensors 111, 112, etc. in a multi-dimensional input device. Note that although the reference numerals correspond to the motion sensors in the example track-ball of FIG. 1, for ease of understanding, these sensors in FIG. 2 correspond to any sensor in a multi-dimensional input device, such as inertial sensors, tension sensors, proximity sensors, and the like.

The controller 150 processes the signals from the sensors 111, 112, as well as from any switches 130, as discussed further below with respect to FIG. 3, to determine light-parameter values corresponding to the signals from the input device. The controller 150 communicates these parameters to a light controller 250 that is configured to apply the appropriate control to one or more lights 211 corresponding to these parameters. For example, rotating the ball 100 of FIG. 1A in direction 101 may control the brightness or luminance of the lights, rotating the ball in direction 102 may control the color or chrominance of the lights, and rotating the ball in direction 103 may control the whiteness or saturation of the lights. If there are more controllable features on the lights than dimensions available on the multi-dimensional input device, a switch 130 may be configured to reassign the mapping of the input signals to particular light-parameter values. For example, a set of inputs that control the flashing, blinking, or sequencing of the lights may be enabled by controlling a switch on the input device.

The communication between the controller 150 and the controller 250 may be via any of a variety of wired or wireless means, including direct connection, radio, infrared, and so on. In a preferred embodiment of this system, the input device and the lighting system are each compatible with a home-networking protocol, and the controllers 150, 250 communicate via a corresponding home-network. In a self-contained system, the controllers 150, 250 may be included within the same device, and, in some embodiments, the controllers 150, 250 are embodied as a single processing device, and the 'communication' of the parameters is via registers or memory elements within the processor as each functional block of software code is executed.

The controller 150 is also optionally configured to control a feedback device 120, as discussed further below.

In a preferred embodiment of this invention, sets of defined parameter values are stored as presets 220, to allow a user to quickly set the lights 211 to achieve a predefined effect. This preset option may be provided within the multi-dimensional input device, or within the lighting control. In either embodiment, the multi-dimensional input device includes a control, typically a switch 130, that allows the user to store the current parameters as a preset 220. If multiple presets 220 are provided, the switch 130 may be configured to enable one of the dimensions of the input device to 'scroll' through each preset. As noted above, the input device may include a light 140 that is also controlled by the light control 250. Optionally, the controller 250 can be configured to control the light 140 independently of the lights 211 while the user is scrolling through the presets, or otherwise searching for a desired effect. When the user signals that the desired effect has been achieved, as shown by the light 140, the controller 150 enables the light controller 250 to apply the same settings to the lights 211. The controller 150, or the controller 250, also optionally includes a scheduler that is configured to activate a preset 220 at a given time, or a sequence of presets 220 at scheduled times.

Figure 3:
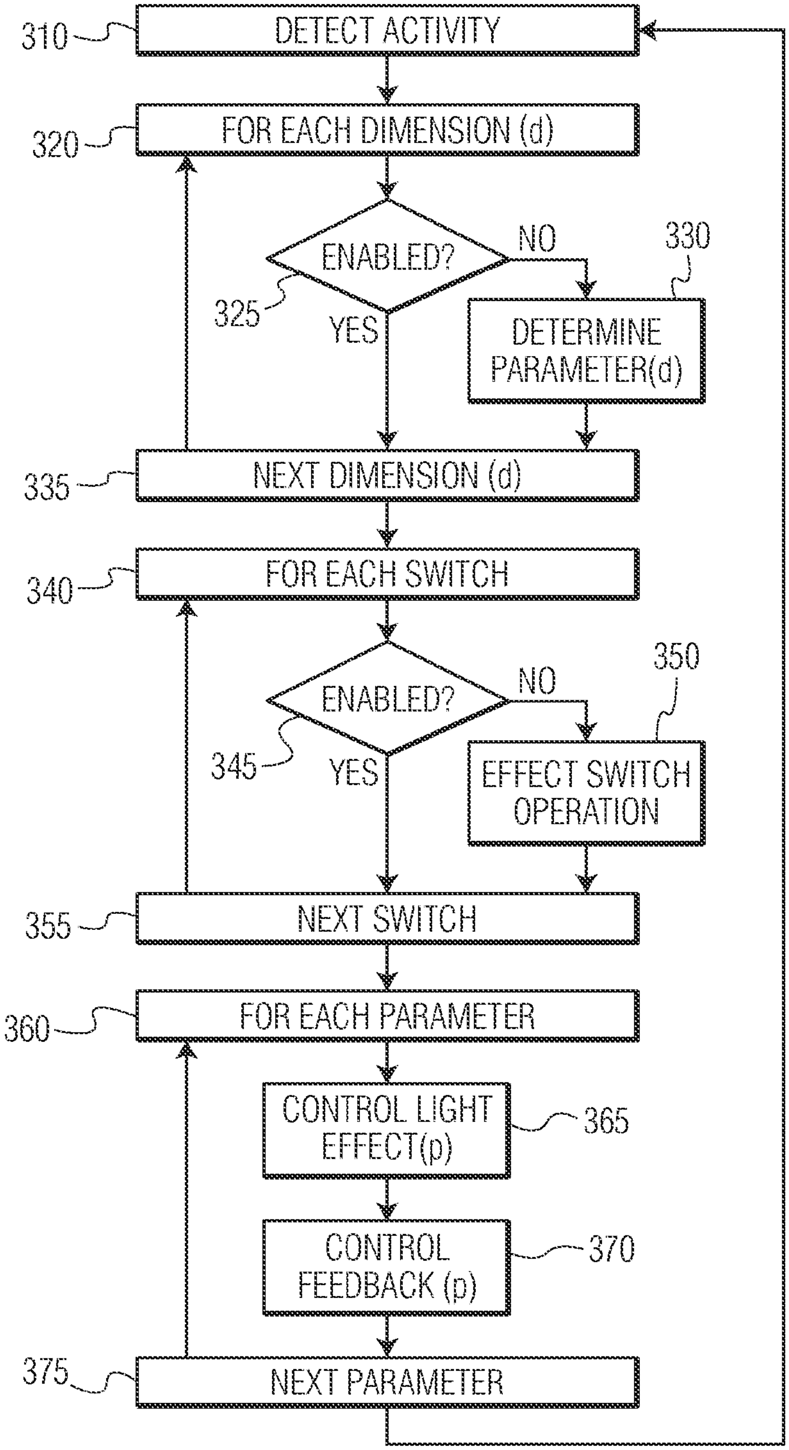
FIG. 3 illustrates an example flow diagram of a lighting control system in accordance with this invention.

FIG. 3 illustrates an example flow diagram for use in a controller 150 in accordance with this invention. At 310, the controller detects activity from one or more sensors or switches on a multi-dimensional input device.

When an activity is detected, the controller executes the loop 320-335 for each dimension of the input device. In a preferred embodiment of this invention, the controller allows a user to selectively enable one or more of the input dimensions, so that, for example, the user can choose to only affect the luminance of the lighting system, and keep the other lighting effects fixed at their current setting. At 335, each dimension is checked to see if movements in that dimension are enabled to affect its corresponding parameter. If it is enabled, the lighting-parameter corresponding to the enabled direction is updated, based on any movement in the enabled direction.

After all of the input dimensions are processed, the controller processes each switch input, via the loop 340-355. Depending upon the current mode of the input device, some switches may be disabled from affecting the operation of the input device. At 345, each switch is checked to see if it is enabled, and if so, the operation controlled by the state of the switch is executed, at 350. As noted above, a switch may effect the storing or recall of preset parameters, thereby storing or overriding the lighting-parameter values set at 330.

After all of the switches, if any, are processed, each lighting-parameter is applied to the lighting system, via the loop 360-375. At 365, the lighting-effect corresponding to the parameter is controlled. As noted above, this control may affect the luminance, chrominance, saturation, etc. of the entire lighting system, or it may be limited to select lights, such as an optional light source in the input device, depending upon the current mode of the input device, or the current mode of the lighting system.

At 370, the controller optionally controls one or more feedback devices based on one or more of the lighting-parameters. For example, the failure rate of most lights is dependent upon the luminance level. A feedback device could be configured to provide increasing resistance to a continued increase in luminance, to discourage high luminance levels. In another example, the resistance could increase based on the difference from a selected preset. Similarly, using an 'expert systems' approach, the resistance could be based on sets of rules provided by the user, or provided by third-party experts in lighting effects. Such an expert system approach is particularly well suited for use in a professional lighting setting, such as a theatre, to reduce the likelihood of errors, and/or to reduce the amount of skill or training required to operate the system.

After all of the parameters are applied to the lighting system and optional feedback system, the controller returns to 310 to receive the next input from the input device and to repeat the above process.

The foregoing merely illustrates the principles of the invention. It will thus be appreciated that those skilled in the art will be able to devise various arrangements which, although not explicitly described or shown herein, embody the principles of the invention and are thus within the spirit and scope of the following claims.

In interpreting these claims, it should be understood that:

a) the word "comprising" does not exclude the presence of other elements or acts than those listed in a given claim;

b) the word "a" or "an" preceding an element does not exclude the presence of a plurality of such elements;

c) any reference signs in the claims do not limit their scope;

d) several "means" may be represented by the same item or hardware or software implemented structure or function;

e) each of the disclosed elements may be comprised of hardware portions (e.g., including discrete and integrated electronic circuitry), software portions (e.g., computer programming), and any combination thereof;

f) hardware portions may be comprised of one or both of analog and digital portions;

g) any of the disclosed devices or portions thereof may be combined together or separated into further portions unless specifically stated otherwise;

h) no specific sequence of acts is intended to be required unless specifically indicated; and i) the term "plurality of" an element includes two or more of the claimed element, and does not imply any particular range of number of elements; that is, a plurality of elements may merely include two elements.

The invention claimed is:

1. A lighting control system for controlling multiple parameters of a light source, the lighting control system comprising:

an input device configured to detect motion in a plurality of dimensions including a first, a second and a third dimension to create a respective first input, second input and third input;

a controller for electronically receiving said first input, said second input and said third input, wherein said controller maps said first input to a first lighting parameter, said second input to a second lighting parameter, said third input to a third lighting parameter;

wherein said controller is in electronic communication with a light controller, said controller transferring said first, second and third lighting parameters to said light controller to modify a combined light output of a first light, a second light and a third light, said corresponding light output modified to correspond to said first, second and third lighting parameters and controlled by said plurality of dimension inputs from said input device;

a feedback element configured to restrict the motion of said input device in said first, second and third dimension;

said controller configured to control said feedback element based on said first, second and third input;

said light controller operable to apply a set of rules associated with said lighting parameters and restrict the motion of said input device according to said rules.

2. The lighting control system of claim 1, further including a light within said input device and further in communication with said light controller, said light controller operable to apply said first, second and third lighting parameters to said light within said input device.

3. The lighting control system of claim 1, wherein said controller and said light controller are contained within said input device.

4. The lighting control system of claim 1, wherein said controller and said light controller are separated.

5. The lighting control system of claim 1, wherein said controller and said light controller are contained within said input device and utilize a first processor.

6. The lighting control system of claim 1, further including at least one switch in said input device actuatable to reassign said first, second and third input to varying lighting parameters.

7. The lighting control of claim 1, wherein said input device is a rotational track ball haying at least one sensor for detecting movement in said first, second and third dimension.

8. A method of controlling a lighting system, comprising:

moving an input device in a first, second and third dimension of motion;

translating said first, second and third motion into a first, second and third input;

mapping said first, second and third input to a first, second and third lighting parameter;

transmitting said first, second and third lighting parameters to a lighting controller;

modifying the combined light output of a first light, a second light and a third light by said lighting controller according to said first, second and third parameters;

restricting by use of least one feedback element the motion of said input device;

preventing the movement of said input device in one of said first, second or third dimension of motion;

applying a set of rules associated with said lighting, parameters;

restricting the motion of said input device according to said rules.

9. The method of claim 8, further including actuating at least one of said feedback elements on said input device to restrict said movement.

10. The method of claim 8, wherein said moving step further includes rotating a track ball in a housing allowing for first, second and third directions of rotatable movements.

11. The method of claim 8, further including adjusting the light output of a light element within said input device based upon said mapping step.

* * * * *